(No Model.) 6 Sheets—Sheet 1.

J. H. STONEMETZ.
COMBINED POINT FEED AND DROP ROLL FEED BOOK FOLDING MACHINE.

No. 396,308. Patented Jan. 15, 1889.

Fig. I.

Witnesses.
G. J. Mead.
F. J. Bassett

Inventor.
John H. Stonemetz.
By H. Sturgeon
Atty.

(No Model.) 6 Sheets—Sheet 2.

J. H. STONEMETZ.
COMBINED POINT FEED AND DROP ROLL FEED BOOK FOLDING MACHINE.

No. 396,308. Patented Jan. 15, 1889.

(No Model.) 6 Sheets—Sheet 3.

J. H. STONEMETZ.
COMBINED POINT FEED AND DROP ROLL FEED BOOK FOLDING MACHINE.

No. 396,308. Patented Jan. 15, 1889.

Witnesses.
G. J. Mead.
F. J. Barrett

Inventor.
John H. Stonemetz.
By H. Sturgeon
Atty.

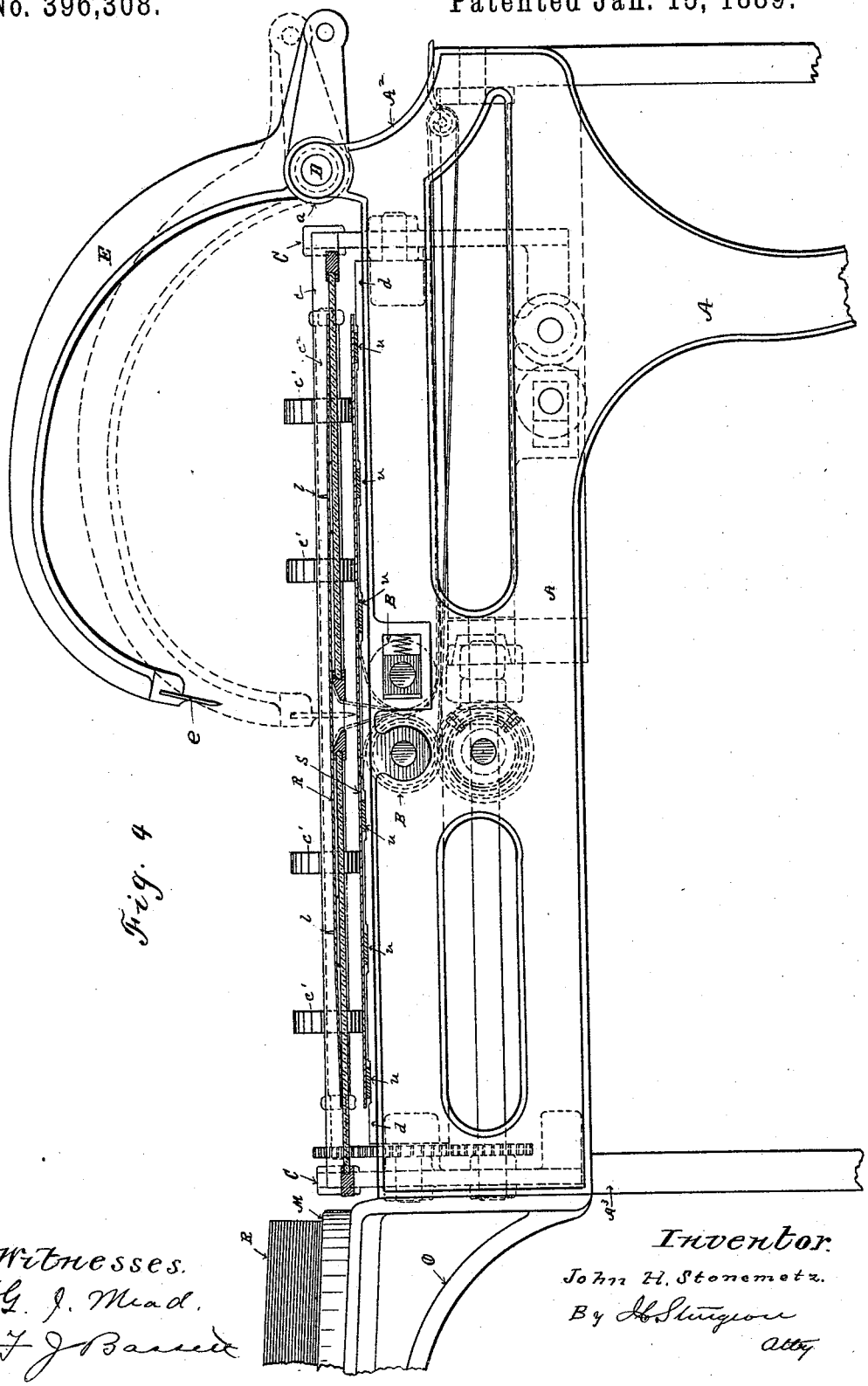

(No Model.) 6 Sheets—Sheet 5.
J. H. STONEMETZ.
COMBINED POINT FEED AND DROP ROLL FEED BOOK FOLDING MACHINE.
No. 396,308. Patented Jan. 15, 1889.
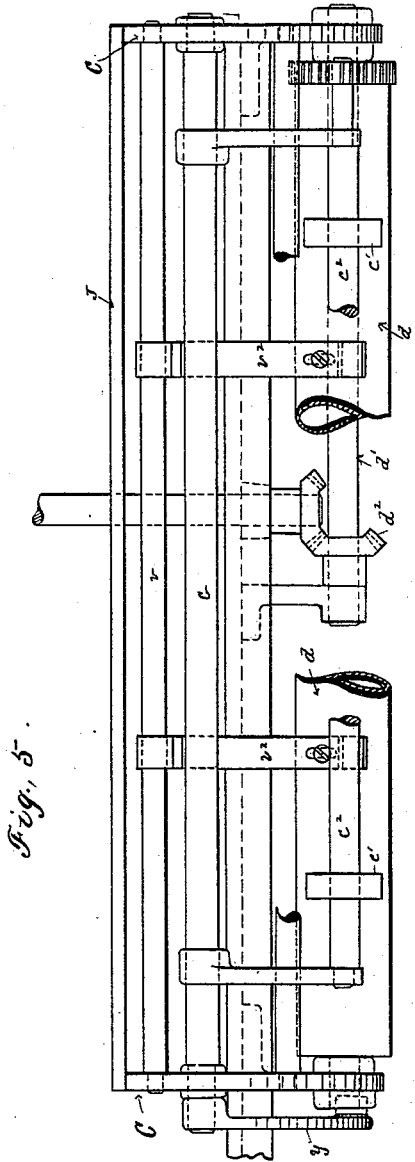
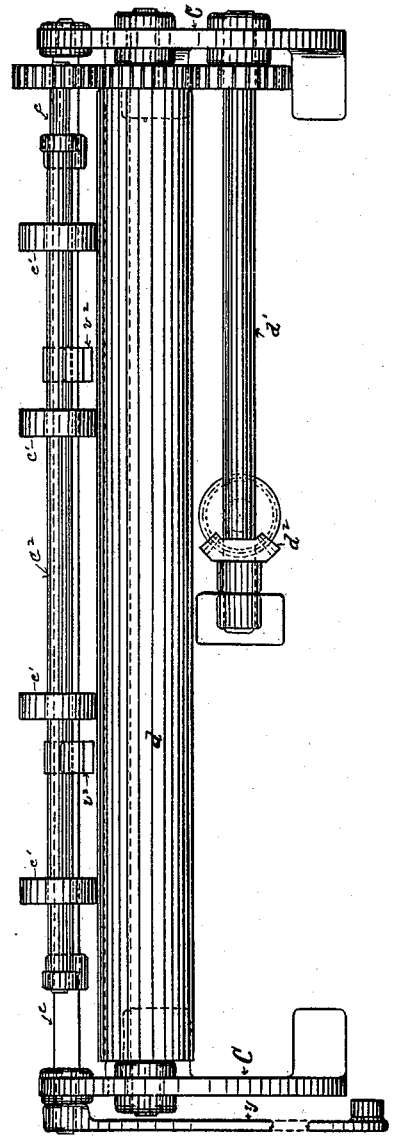
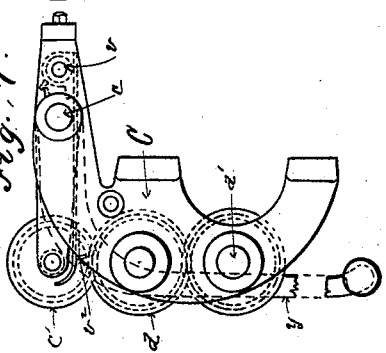
Witnesses.
G. J. Mead.
F. J. Bassett
Inventor
John H. Stonemetz.
By H. Sturgeon
Atty.

(No Model.) 6 Sheets—Sheet 6.
J. H. STONEMETZ.
COMBINED POINT FEED AND DROP ROLL FEED BOOK FOLDING MACHINE.
No. 396,308. Patented Jan. 15, 1889.
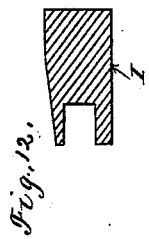
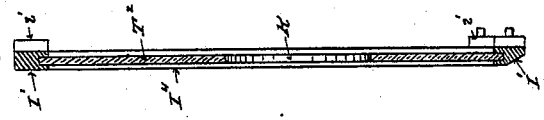
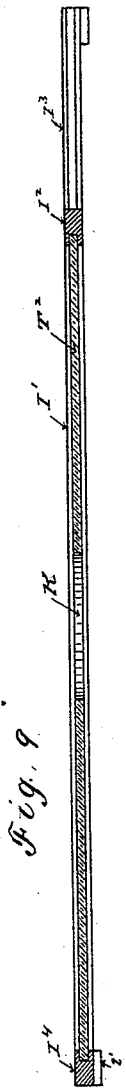
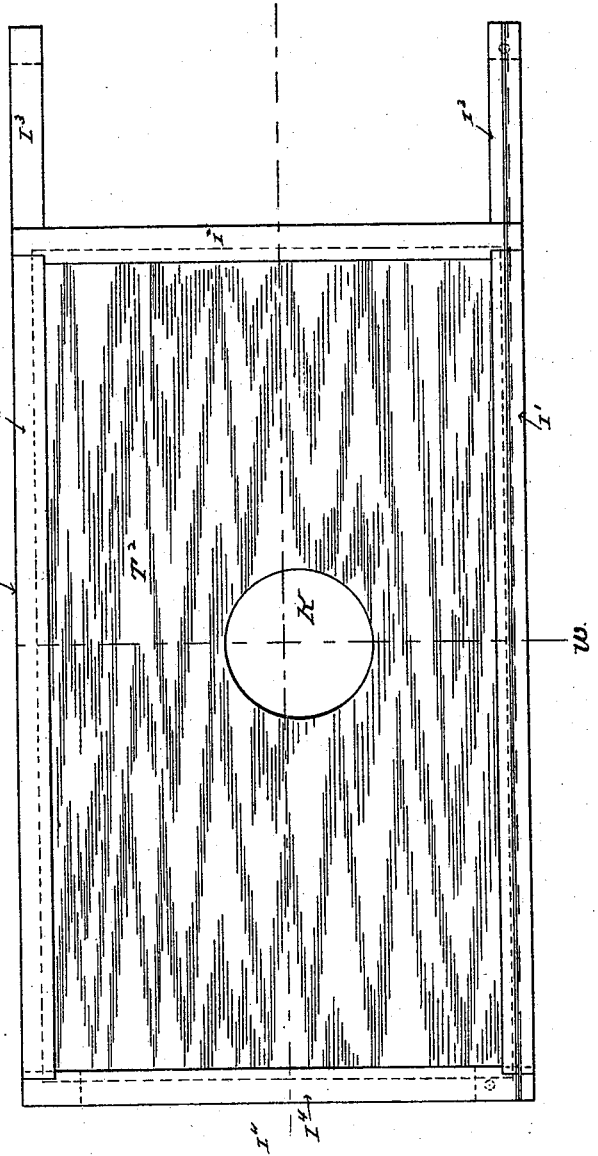
Witnesses
G. J. Mead.
F. J. Barrett
Inventor,
John H. Stonemetz,
By H. Sturgeon
Atty.

UNITED STATES PATENT OFFICE.

JOHN H. STONEMETZ, OF MILLBURY, MASSACHUSETTS, ASSIGNOR TO THE STONEMETZ PRINTER'S MACHINERY COMPANY, OF SAME PLACE.

COMBINED POINT-FEED AND DROP-ROLL-FEED BOOK-FOLDING MACHINE.

SPECIFICATION forming part of Letters Patent No. 396,308, dated January 15, 1889.

Application filed June 27, 1887. Serial No. 242,690. (No model.)

*To all whom it may concern:*

Be it known that I, JOHN H. STONEMETZ, a citizen of the United States, residing at Millbury, in the county of Worcester and State of Massachusetts, have invented certain new and useful Improvements in Combined Point-Feed and Drop-Roll-Feed Book-Folding Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in combined point-feed and drop-roll-feed book-folding machines hereinafter set forth, and explained in the specification and claims, and illustrated in the accompanying drawings, in which—

Figure 1:
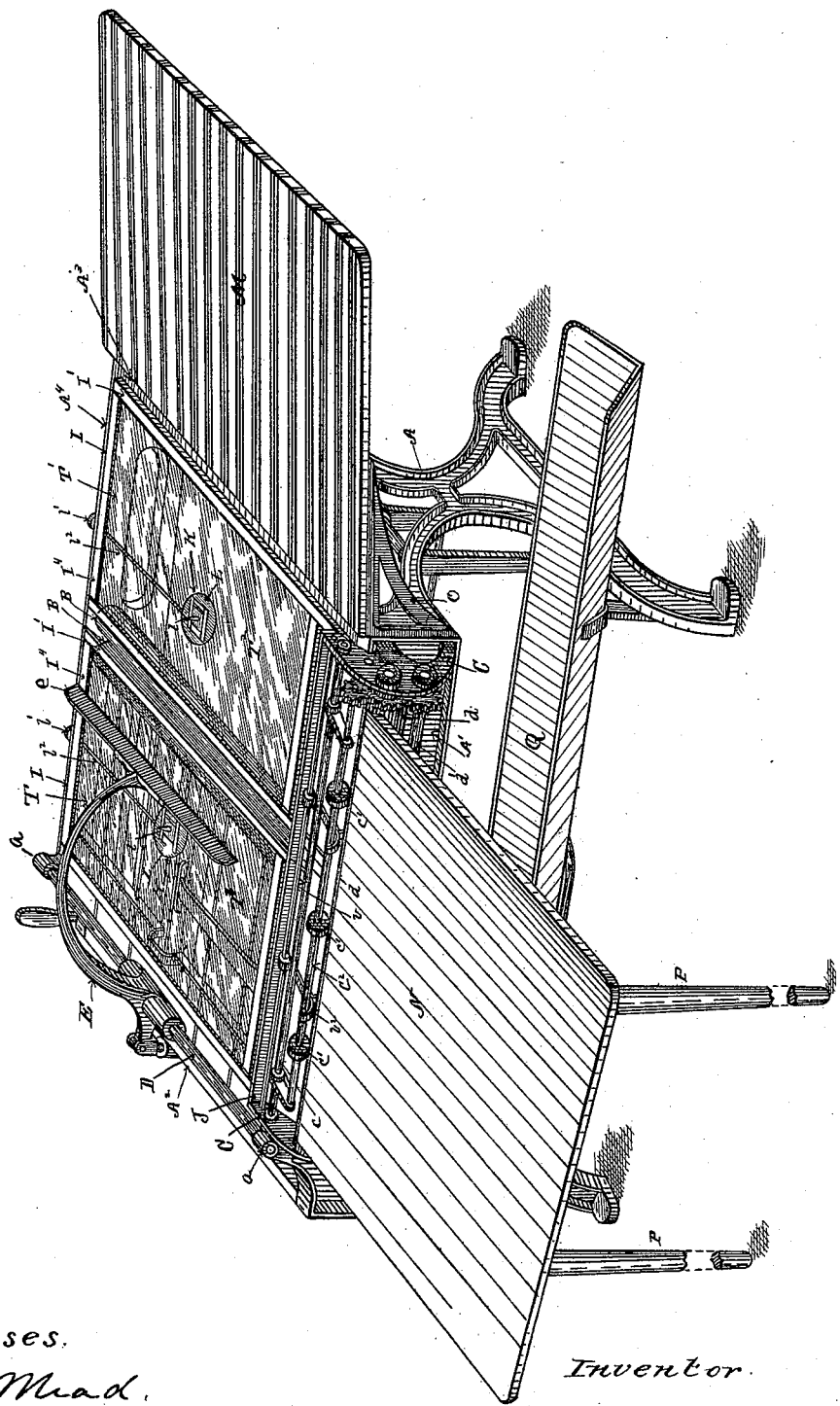
Figure 2:
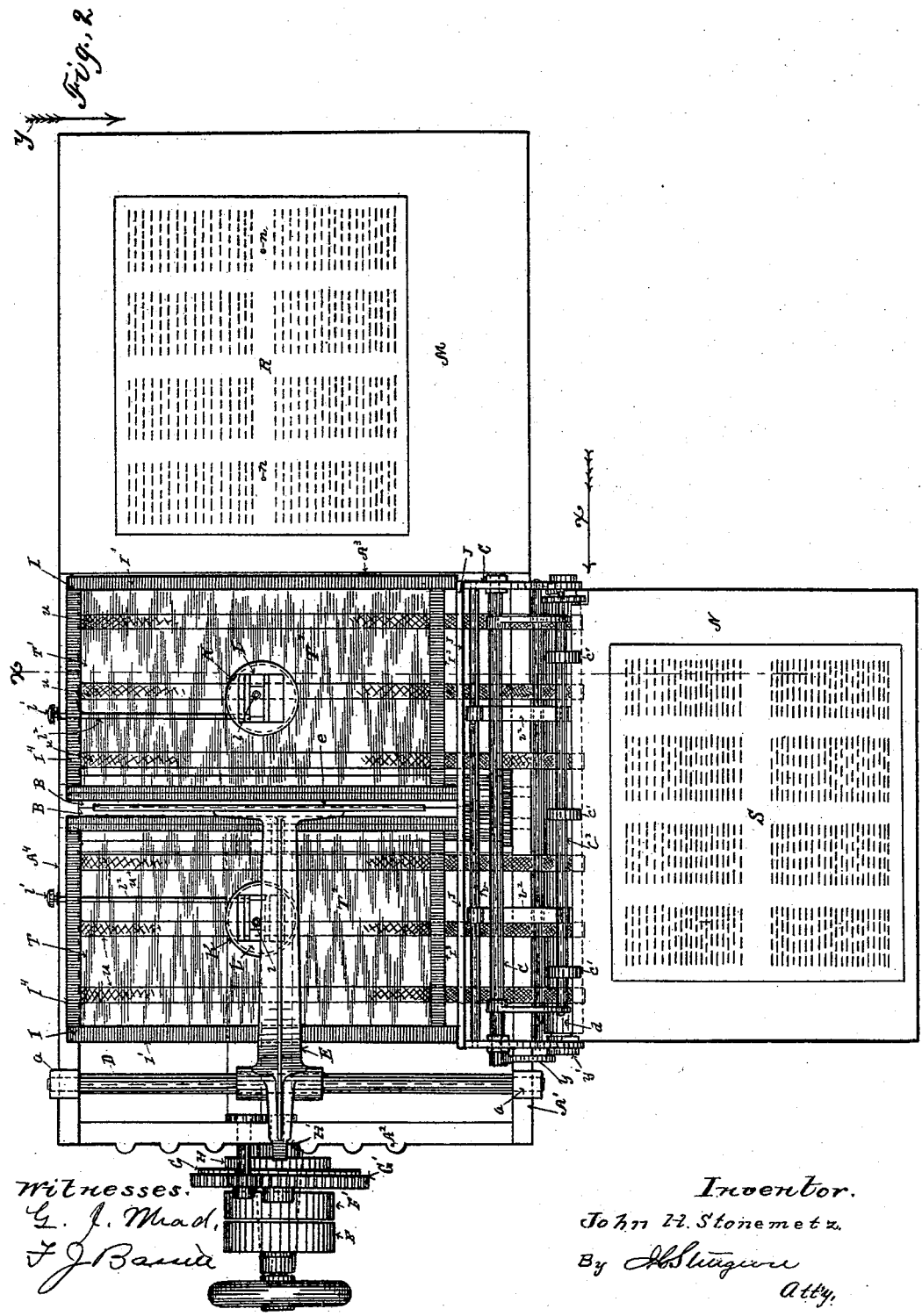
Figure 3:
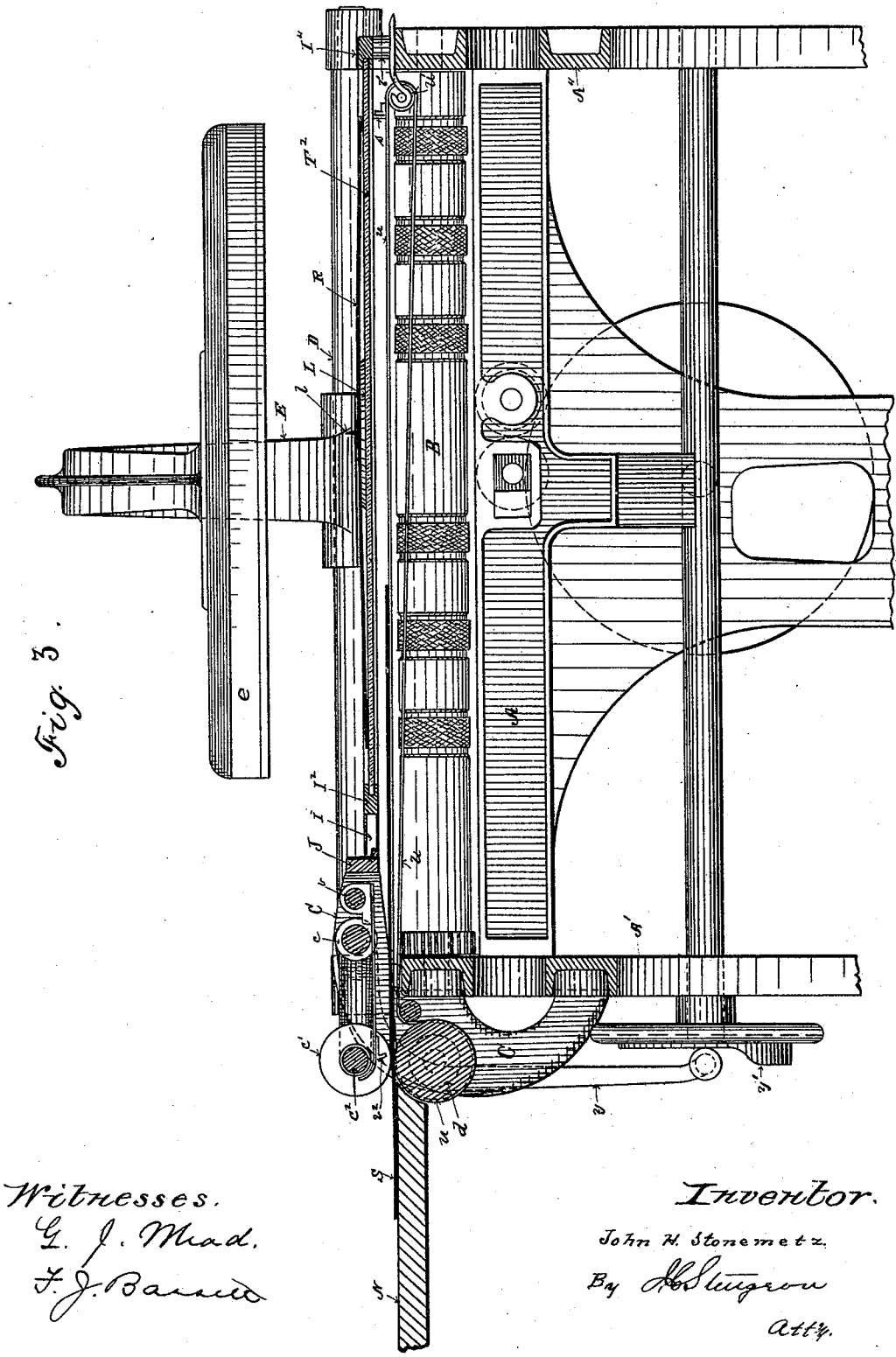

Figure 1 is a perspective view of my improved machine. Fig. 2 is a plan or top view of the same. Fig. 3 is a transverse section of same on the line $x$, looking in the direction of the arrow $x'$ in Fig. 2, showing one sheet of paper adjusted over the points on the table and another sheet passing between the drop-roll-feed mechanism and being carried by tapes into position under the table of the machine. Fig. 4 is a side elevation of my machine, looking in the direction of the arrow $y$ in Fig. 2, (with the driving mechanism of the machine broken away and the table and sheets of paper in the machine shown in section,) showing the sheets in position, one directly beneath the other, ready to be tucked between the folding-rolls to form the first fold. Fig. 5 is a top or plan view of the drop-roll mechanism with parts of the rolls broken away, showing the connection thereof with the driving mechanism of the machine. Fig. 6 is a view of the same in elevation detached from the frame of the machine. Fig. 7 is an end elevation of the same, showing the bracket-frame upon which it is mounted and by means whereof it is secured to the machine-frame. Fig. 8 is a plan or top view of the improved glass tables and the frame-work thereof used on my machine. Fig. 9 is a longitudinal section of the same on the dotted line $z$ in Fig. 8. Fig. 10 is a transverse section of the same on the dotted line $w$ in Fig. 8. Fig. 11 is an end elevation of the frame of my improved table, showing the construction thereof. Fig. 12 is a cross-section of one of the sides or ends of said table-frame full size.

Like letters refer to like parts in all of the figures.

Among the features of my invention are, first, the embodying in a paper-folding machine of drop-roll-feed mechanism arranged to feed sheets from one table to the machine and point-feed mechanism in the tables on the top of the machine, to which sheets can be fed from another table, so as to bring the two sheets simultaneously into position under the first folding-blade and be folded together; second, to so construct and arrange the mechanism of a book-folding machine that one sheet can be fed to points or guides on the top of the table of the machine and another sheet to guides under the table by drop-roll and carrier-tape mechanism, and the two sheets folded together, or so that sheets can be fed to points or guides on the table and folded alone, or so that sheets can be fed to guides by the drop-roll and tape mechanism and folded alone, thus adapting this machine to do a wide range of work not possible to be done on folding-machines as heretofore constructed.

Other features of my invention are hereinafter set forth in the specification and claims.

In the construction of my improved paper-folding machine, A is the frame; B B, the first set of folding-rolls; E, the first folding-blade arm, and D the axis thereof; $e$, the first folding-blade, and F F', G G', and H H' the driving mechanism of the machine, which parts are of the ordinary construction used in the Stonemetz folding machinery and form no part of this invention. Therefore I will only refer thereto in the specification when necessary to the description of the novel parts of said machine constituting my invention.

On the side A' of the frame A of the machine I secure brackets C C, in which are journaled the axial shaft $c$ of the drop-rolls $c'$ $c'$ $c'$, the feed-roll $d$, and the axial shaft $v$ of the guides $v^2$, and the driving mechanism of these parts consisting of a shaft, $d'$, geared to the feed-roll $d$, which shaft is driven by a miter-gear, $d^2$, intermeshing with a like gear on a cam-shaft connecting with the main driving mechanism of the machine. The shaft $c^2$ of the drop-rolls $c'$ is mounted in arms secured to the shaft $c$, and a spur-gear on one end of the shaft $c^2$ intermeshes with the gearing on the end of the feed-roll $d$ and is driven thereby. The shaft $c$, operating to raise and lower the drop-rolls $c'$ $c'$ $c'$, is provided with a curved arm, $y$, which engages with a cam-wheel, $y'$, of such shape that its rotating surface, acting on the end of the arm $y$, serves to raise and lower the drop-rolls $c'$ $c'$ $c'$ at the proper times, as required. On the end $A^2$ of the frame A, I provide ears $a$ $a$, which operate as bearings, in which the axial shaft D of folding-blade arm E is journaled, the first folding-blade, $e$, being secured to and operated by the arm E, the arm E being operated by the usual means.

To the brackets C C, contiguous to the drop-roll mechanism mounted thereon, I secure a feed-table, N, the same being hinged thereto at one end, while the outer end is supported upon legs P P, so that sheets can be readily fed therefrom to the drop-roll mechanism above described. Passing around the feed-roll $d$ carrier-tapes $u$ extend to the opposite side of the machine under the tables T T' to tape-spools $u'$, secured to the machine-frame A. Adjustable sheet-stops $s$ are also secured to the machine-frame, adapted to stop sheets being conveyed by the carrier-tapes $u$ in position to be folded between the first folding-rolls, B B.

On the end $A^3$ of the machine-frame A, I secure another feed-table, M, which is secured to and supported by the blocks O O, attached to the machine-frame, the top of the table M being of suitable height to be convenient for feeding sheets therefrom to points or guides on the tables T T' on the top of the machine.

The tables T T', I make of glass plates $T^2$, set in the grooved metal frames I, constructed of the side styles, I' I', and end styles, $I^2$ and $I^4$, firmly secured together at the corners. The side styles, I' I', are, however, provided at one end with projections $I^3$ $I^3$, as and for the purpose hereinafter set forth. At or near the centers of the glass plates $T^2$, I make openings K therein, in which I secure point-plates L. In the point-plates L points $l$ are adjustably secured and provided with mechanism (not shown) whereby they can be adjusted lengthwise or crosswise of the tables T T', as desired, to suit the location of the point-punchers $n$ $n$ in the sheets R, (see Fig. 2,) by means of rods $l^2$, which are connected with the point mechanism on the plates L and extend out through the end styles, $I^4$, of the tables T T', where they terminate in knobs $l'$, adapted to be turned and operated by the operator of the machine to adjust the points $l$ as desired. The tables T T' are secured to the top of the machine-frame, preferably by supporting the end styles, $I^4$, of the tables upon blocks $i$ under the ends thereof, which blocks $i$ rest upon the top of the side frame, $A^4$, of the machine-frame A, while the opposite ends of the tables T T' are supported by the projections $I^3$ $I^3$ of the styles I' I', which rest upon a bar, J, secured to the ends of the brackets C C, hereinbefore described, so that when the tables are in place upon the machine they occupy the positions thereon illustrated in Figs. 1 and 2, leaving an opening between them for the folding-blade $e$ to pass down to the first pair of folding-rolls, B B. It will be observed that by this arrangement the tables T T' rest upon the top of the machine, as described, and can be removed at any time when desired for any purpose. If desired, however, the tables T T' can be more permanently secured in place by means of bolts or screws.

The mechanism for making the second and subsequent folds is not shown or described, as these features do not constitute any part of this invention.

From the foregoing description of my invention it will be readily seen that two feeders can feed sheets to the machine from different feed-tables at the same time, one from the table N to the drop-roll-feed mechanism and the other from the table M to the point mechanism in the tables T T', so that the two sheets so fed will be folded together. It is also obvious that the machine will operate to fold single sheets fed either from the table N to the drop-roll mechanism or from the table M to the points $l$ $l$ in the tables T T' with equal facility; and when desired the tables T T', with the point mechanism therein, can at any time be quickly removed from the machine, thus converting it into a convenient drop-roll-feed mechanism.

In constructing the tables T T' of my machine of glass plates $T^2$, I enable the operator to at all times see the operation of the folding mechanism of the machine through the tables, and thereby instantly detect any imperfection in the operation thereof. I am also enabled in constructing the tables of glass to entirely overcome the tendency of electrically-charged sheets to adhere to the tables, as is frequently the case when the tables are constructed of iron.

Having thus described this invention so as to enable others to construct and operate the same, what I claim as new, and desire to secure by Letters Patent of the United States, is—

1. The combination, in a book-folding machine, of drop-roll-feed, and carrier-tape mechanism with point-feed mechanism in the tables thereof, by means whereof two sheets fed from different feed-tables at the same time can be folded together, substantially as set forth.

2. The combination, in a book-folding machine, of drop-roll-feed and carrier-tape mechanism for feeding and conveying sheets from a feed-table at one side of the machine to the first folding-rolls, with removable tables on said machine, having point-feed mechanism therein arranged to feed from a feed-table at the end of the machine, whereby said machine is adapted to operate either as a drop-roll-feed machine or as a point-feed machine, as desired, substantially as set forth.

3. The combination, in a book-folding machine, of the feed-table N, the drop-roll-feed mechanism $c'\,c'\,c'\,y\,y'$, the guides $v^2\,v^2$, and the feed-roll $d$, and the carrier-tapes $n$, and sheet-stop $s$, with the feed-table M, the machine-tables T T', having points $l$ therein, the folding-blade $e$, and the folding-rolls B B, substantially as and for the purpose set forth.

In testimony whereof I affix my signature in presence of two witnesses.

JOHN H. STONEMETZ.

Witnesses:
J. D. CLARK,
C. A. SEER.